N. Martz.
Horse Rake.

Nº 14,321. Patented Feb. 26, 1856.

UNITED STATES PATENT OFFICE.

NATHAN MARTZ, OF BRIAR CREEK TOWNSHIP, COLUMBIA COUNTY, PA.

IMPROVEMENT IN HORSE-RAKES.

Specification forming part of Letters Patent No. 14,321, dated February 26, 1856.

*To all whom it may concern:*

Be it known that I, NATHAN MARTZ, of Briar Creek township, in the county of Columbia and State of Pennsylvania, have invented certain new and useful Improvements in Horse-Rakes; and I hereby declare that the following is a full, clear, and exact description thereof, reference being had to the accompanying drawings, making part of this specification, in which—

Figure 1:
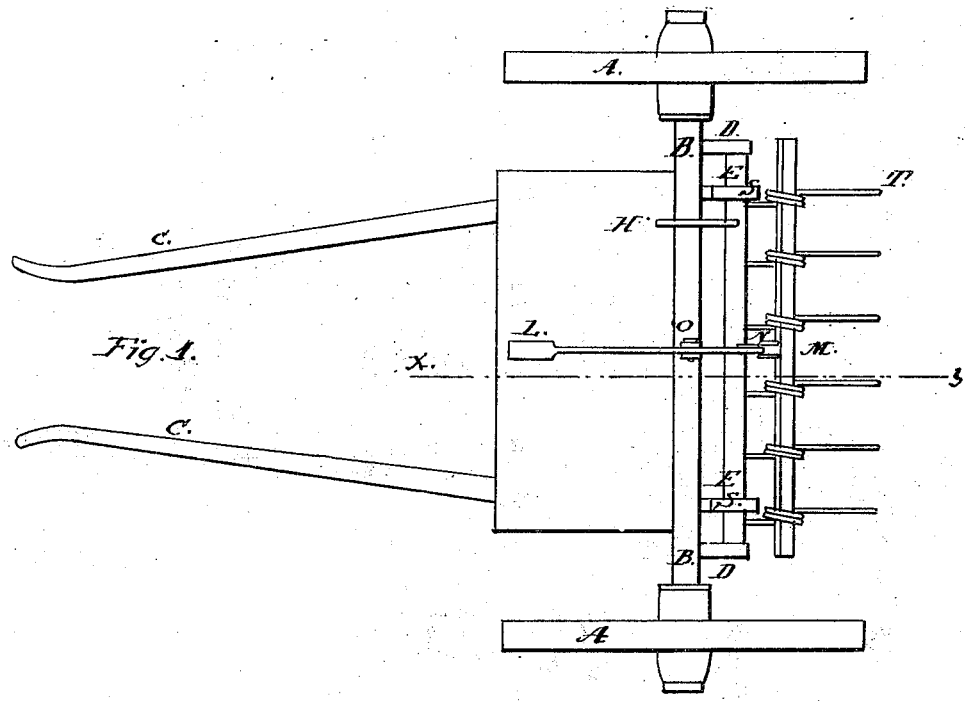
Figure 2:
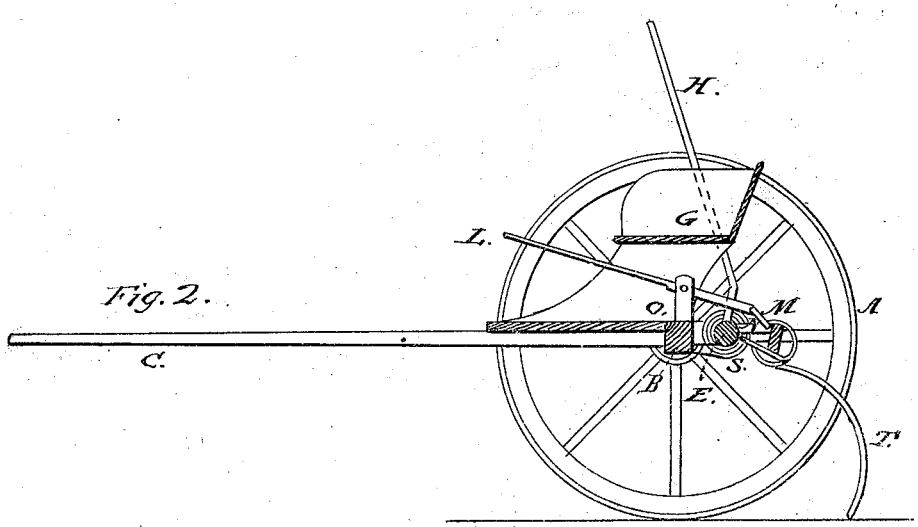

Figure 1 represents a plan view of the rake, the driver's seat being removed. Fig. 2 shows a vertical section of the rake through $x\ y$.

The rake is applied to a carriage, which is composed of two wheels, A A, revolving upon an axle-tree, B, to which two shafts, C, are securely fastened.

Near the wheels and on the axle-tree are two brackets, D D, in which a rocking shaft, E E, vibrates upon its trunnions. The rocking shaft E, which, with its additional contrivances, constitutes the principal feature of my improvement, is made of wrought-iron and of such a sectional size as to resist the strains of torsion to the action of which it is submitted.

Each wire tine T of the rake is separately and firmly fastened to the rocking shaft E by suitable means—such as by welding, for instance. Between the last two tines, and near the extremity of the shaft, is applied a coil-spring, S, which, being fastened at one extremity to the shaft E and at the other to the axle-tree B, has a tendency to keep the rake vertically down upon the ground, supplying thus the necessity of heavy and clumsy implements for the performance of the intended work, saving a considerable amount of power lost, (dead weight,) and affording greater facilities for the adaptation to the inequalities of the ground.

On the right-hand side, (facing front toward the horse,) and near to the coil-spring S, is a hand-lever, H, operating the rocking shaft E by the right hand of the driver seated on his seat G.

By the above-described arrangement the management of the rake is very easy, and a very slight lifting-power applied to the handle H will raise from the ground and disincumber it of the hay or stubble it may have gathered.

Should the hand of the operator be engaged, he can easily work the rake by applying pressure with his foot upon the lever L. That lever is not attached to the rocking shaft directly, but is connected thereto by means of a chain-link, M, which engages itself into the hole of the projecting lever N. The lever L balances over a supporting-pin in the upright bracket O.

The description of the implement is completed by that of the seat for the driver, arranged in such a manner that the center of gravity of the operator may pass through the axle-tree, or nearly so, in order to give stability to the apparatus, to decrease the resistance of the horse, and to afford the greatest facilities for its working and controlling the operation.

Having thus fully described my improvement, what I claim as my invention, and desire to secure by Letters Patent, is—

The combination of the coiled spring S, axle B, rock-shaft E, and rake-teeth T, when arranged in the manner and for the purpose herein described.

In testimony whereof I have signed my name to this specification before two subscribing witnesses.

NATHAN MARTZ.

Witnesses:
CHAS. EVERETT,
A. POLLAK.